United States Patent [19]

Nakamura et al.

[11] Patent Number: 5,233,471
[45] Date of Patent: Aug. 3, 1993

[54] ZOOM LENS

[75] Inventors: Akira Nakamura, Tokyo; Yuichi Nakano, Kanagawa, both of Japan

[73] Assignee: Sony Corporation, Japan

[21] Appl. No.: 803,439

[22] Filed: Dec. 6, 1991

[30] Foreign Application Priority Data

Dec. 28, 1990 [JP] Japan .................................. 2-417122

[51] Int. Cl.[5] ..................... G02B 15/14; G02B 13/18
[52] U.S. Cl. .................................... 359/684; 359/687; 359/715
[58] Field of Search ............... 359/686, 687, 684, 715, 359/708, 676, 774

[56] References Cited

U.S. PATENT DOCUMENTS

| | | | |
|---|---|---|---|
| 4,802,747 | 2/1989 | Horiuchi | 359/687 |
| 4,818,083 | 4/1989 | Mihara | 359/687 |
| 4,859,042 | 8/1989 | Tanaka | 359/687 X |
| 4,995,707 | 2/1991 | Hashimoto | 359/687 |

FOREIGN PATENT DOCUMENTS

| | | | |
|---|---|---|---|
| 0082812 | 5/1982 | Japan | 359/687 |
| 8706717 | 11/1987 | PCT Int'l Appl. | |

OTHER PUBLICATIONS

86 Optik, 73 (1986), "A novel configuration of zoom lens", Kazuo Tanaka, Video Products Development Center, Canon Inc., Japan.

Primary Examiner—Bruce Y. Arnold
Assistant Examiner—David R. Parsons
Attorney, Agent, or Firm—Ronald P. Kananen

[57] ABSTRACT

A zoom lens is provided, in which a fixed first lens group having a positive refracting power, a second lens group having a negative refracting power and which realizes a variable magnification, a fixed third lens group having a positive refracting power and a fourth lens group having a positive refracting power which compensates fluctuation of an image surface caused by the variable magnification and which focuses an image are sequentially provided from an object side. In this zoom lens, the third lens group is composed of two separate lenses of a positive lens (31) and a negative lens (32). At least one surface of the positive lens (31) is formed as an aspherical surface and a surface of the negative lens (32) opposing the image surface side is concaved to the image surface side. Thus, the zoom lens of this invention can be miniaturized and reduced in weight without deteriorating the characteristics such that a variable magnification is large and that an F number is small.

19 Claims, 4 Drawing Sheets

FIG. 3A
Spherical Aberration
FIG. 3B
Astigmatism
FIG. 3C
Distortion
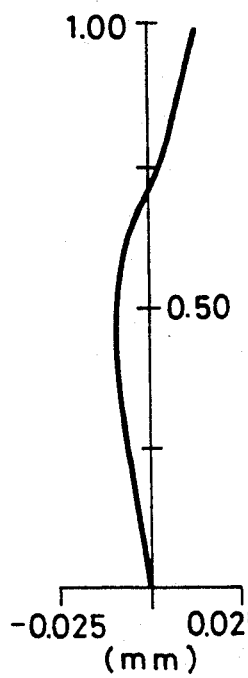
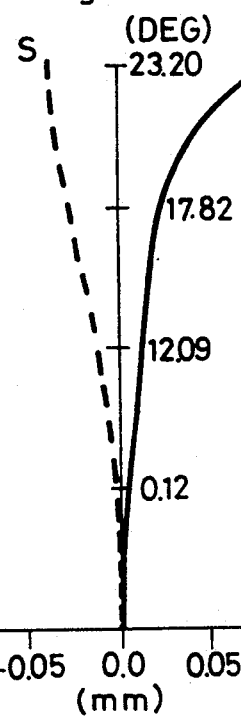
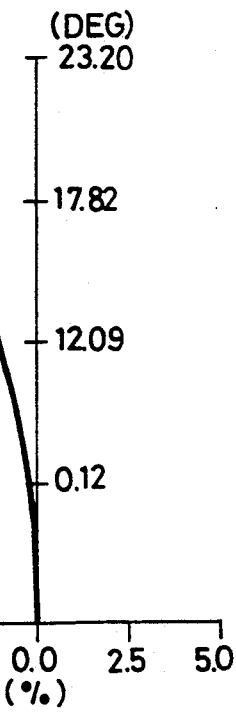
FIG. 4A
Spherical Aberration
FIG. 4B
Astigmatism
FIG. 4C
Distortion
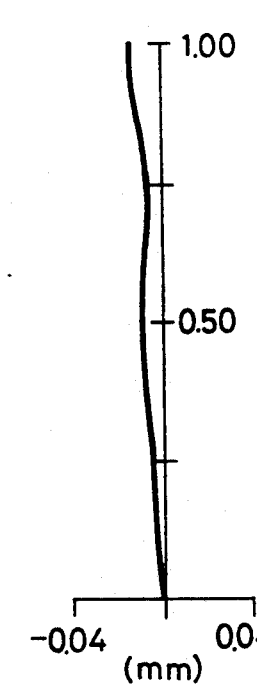
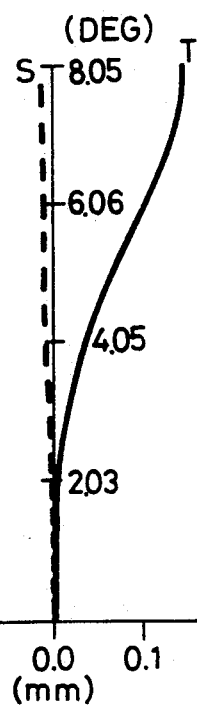
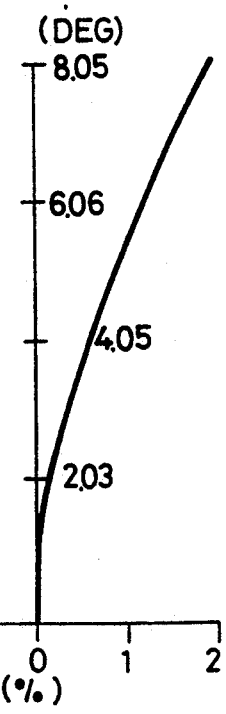

Spherical Aberration

Astigmatism

Distortion

ZOOM LENS

BACKGROUND OF THE INVENTION

1. Field of the Invention

The present invention generally relates to zoom lenses and, more particularly, is directed to a zoom lens for use with electronic still cameras, video cameras or the like, for example.

2. Description of the Related Art

At present, consumer video cameras employ a lens having a zooming ratio of 6 times or more and whose F number is smaller than 2.0 as a zoom lens. Recently, it has become desirable for the video camera to be miniaturized and reduced in weight while maintaining the features such that the zoom lens has large variable magnification and which also is bright.

To meet the requirements such that the video camera is miniaturized and reduced in weight, an imager size of a charge-coupled device (CCD) image pickup device utilized as the image pickup element is miniaturized more because it is to be noted from a scaling law standpoint that a camera lens itself can be miniaturized in accordance with the reduction of the imager size.

The conventional zoom lens, however, comprises 10 spherical lenses or more. There is then the disadvantage such that the conventional lens cannot be miniaturized and reduced in weight sufficiently. Further, when the camera lens is miniaturized from a scaling law standpoint, the resulting precison required for each of the lenses constituting the zoom lens also is increased so that, if the number of the lenses constituting the zoom lens remains the same, then the zoom lens cannot be processed without difficulty. Particularly, when a lens element is finished as a spherical surface by the polishing-treatment, if the radius of curvature of the spherical surface is reduced, there is then the risk that a manufacturing cost for achieving the required precision prescribed is increased considerably.

In order to remove the above-mentioned disadvantage and risk, a method of manufacturing a lens by molding some suitable materials such as plastics, glass or the like has been established recently. According to this method of manufacturing the lens by the molding-process, there is then the possibility that upon mass-production the manufacturing cost of the lens can be reduced as compared with the above-mentioned method of manufacturing the lens by the polishing-process. Further, in accordance with the molding-process, the lens surface can be formed as an aspherical surface with ease and the number of lens elements constructing the camera lens can be reduced, which can make a great contribution to the camera lens when the camera lens is miniaturized and reduced in weight.

OBJECTS AND SUMMARY OF THE INVENTION

Therefore, it is an object of the present invention to provide an improved zoom lens in which the aforesaid shortcomings and disadvantages encountered with the prior art can be eliminated.

More specifically, it is an object of the present invention to provide a zoom lens which can be miniaturized while maintaining the characteristics such that a variable magnification thereof is large and that an F number thereof is small.

Another object of the present invention is to provide a zoom lens which can be reduced in weight while maintaining the characteristics such that a variable magnification thereof is large and that an F number thereof is small.

A further object of the present invention is to provide a zoom lens whose full length can be reduced.

Still another object of the present invention is to provide a zoom lens in which bad influences such as ghosts or the like can be reduced.

As an aspect of the present invention, a zoom lens is provided, in which a fixed first lens group having a positive refracting power, a second lens group having a negative refracting power and which realizes a variable magnification, a fixed third lens group having a positive refracting power and a fourth lens group having a positive refracting power which compensates fluctuation of an image surface caused by the variable magnification and which focuses an image are sequentially provided from an object side. In this zoom lens, the third lens group is composed of two separate lenses of a positive lens and a negative lens. At least one surface of the positive lens is formed as an aspherical surface and a surface of the negative lens opposing the image surface side is concave on the image surface side. Thus, the zoom lens of this invention can be miniaturized and reduced in weight without deteriorating the characteristics such that a variable magnification is large and an F number is small.

BRIEF DESCRIPTION OF THE DRAWINGS

The following detailed description, given by way of example and not intended to limit the present invention solely thereto, will best be understood in conjunction with the accompanying drawings in which:

FIGS. 3A through 3C are respectively schematic diagrams showing spherical aberration, astigmatism and distortion presented when the zoom lens of this embodiment is placed in the wide angle lens position;

FIGS. 4A through 4C are respectively schematic diagrams showing spherical aberration, astigmatism and distortion presented when the zoom lens of this embodiment is placed in the intermediate position.

DETAILED DESCRIPTION OF A PREFERRED EMBODIMENT

Prior to the description of the preferred embodiment, a fundamental principle of the present invention will be described below.

Figure 1:
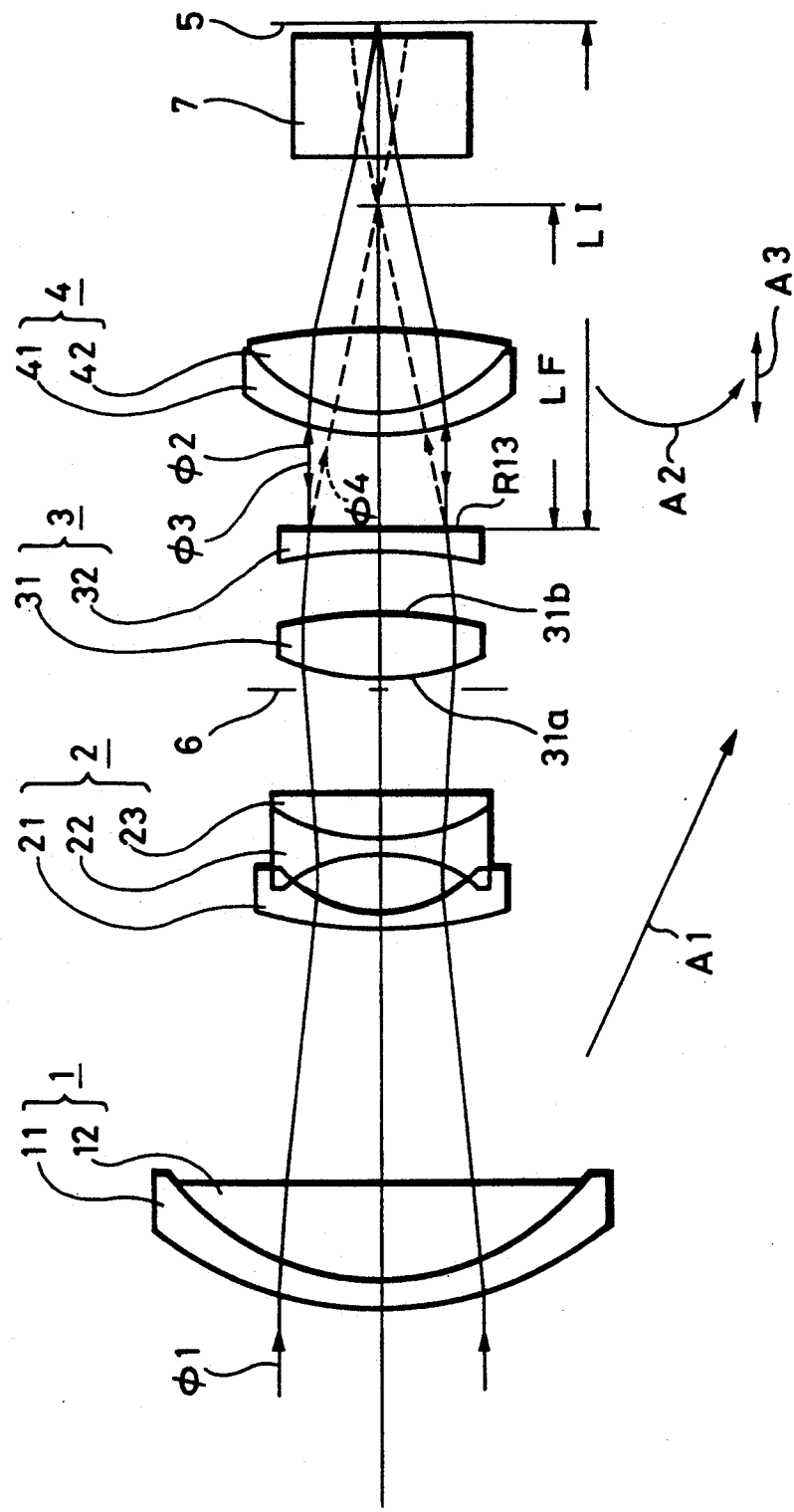
FIG. 1 is a schematic representation of an embodiment of a zoom lens according to the present invention.

As shown in FIG. 1, the present invention is directed to a zoom lens in which a fixed first lens group 1 having a positive refracting power, a second lens group 2 having a negative refracting power and which realizes a variable magnification, a fixed third lens group 3 having a positive refracting power and a fourth lens group 4 having a positive refracting power which compensates fluctuation of an image surface caused by the variable magnification and which focuses an image are sequentially provided from an object side. In this zoom lens, the third lens group 3 is composed of two separate lenses, namely a positive lens 31 and a negative lens 32.

Further, according to the present invention, the shape of a surface $31a$ of the positive lens 31 opposing the object side is expressed by the following equation (4):

$$Z = \frac{Y^2/R31}{1 + \sqrt{1 - (K31 + 1)Y^2/R31^2}} + (AD31)Y^4 + (AE31)Y^6 + (AF31)Y^8 + (AG31)Y^{10} \quad (4)$$

of a point on the respective aspherical surface where Y represents the height from the optical axis, Z represents the distance of the lens apex from the point at the height Y along the optical axis, where such a distance lying on the object side is assumed to be negative, R31 represents the paraxial radius of curvature, K31, AD31, AE31, AF31 and AG31 respectively represent the conic coefficient and the 4th, 6th, 8th and 10th order deformation coefficients. The shape $31b$ of the surface of the positive lens 31 opposing the image surface side is expressed by the following equation (5):

$$Z = \frac{Y^2/R31}{1 + \sqrt{1 - (K32 + 1)Y^2/R32^2}} + (AD32)Y^4 + (AE32)Y^6 + (AF32)Y^8 + (AG32)Y^{10} \quad (5)$$

where corresponding quantities are similarly defined as to the respective aspherical surface. The shape of the positive lens 31 must satisfy the following relation expressed by the equation (6) below:

$$-K31/(8R31^3) - AD31 + K32/(8R32^3) + AD32 > 0 \quad (6)$$

Further, according to the present invention, if R34 (corresponding to R13 in FIGS. 1 and 3) is defined as the radius of curvature of the surface of the negative lens 32 by convention, a positive radius of curvature is assigned to a lens surface that is convex on the object side), fw is defined as the focal length of the zoom lens in the wide angle lens setting or mode and it is defined as the focal length of the zoom lens in the telephoto lens telephoto lens setting or mode, the following relation must be satisfied:

$$0 < R34 < 6\sqrt{fw \cdot ft} \quad (7)$$

As described above, the present invention employs as a fundamental arrangement a zoom lens of a rear-focus system formed of four lens groups of positive, negative, positive and positive lens groups composed of a fixed first lens group 1 having a positive refracting power, a second lens group 2 having a negative refracting power as a variation, a fixed third lens group 3 having a positive refracting power and a fourth lens group 4 having a positive refracting power which includes both a compensator function for correcting a movement of an image surface by the variable magnification of the second lens group so as to keep the image surface position constant and a focusing function.

Further, according to the present invention, since the zoom lens of the present invention is of the telephoto lens type in which the third lens group 3 is formed of separate positive lens 31 and a negative lens 32 provided respectively from the object side, a principal point position of the third lens group 3 is provided near the object side. Thus, the movable range of the second lens group 2 can be extended effectively and the full length of the zoom lens can be reduced. Also, since the zoom lens of the present invention is of the telephoto lens type, a bundle of light incident on the fourth lens group 4 can be made smaller than that on the third lens group 3 and therefore the four lens groups 4 can be reduced in weight. As a result, a burden on the four lens group driving system can be reduced, the responsiveness to the magnification and focusing can be improved and a lens barrel structure including the lenses and the driving system can be reduced in diameter. Further, since the third lens group 3 is comprised of two lenses, the number of the lenses in the zoom lens can be reduced on the whole and the entirety of the zoom lens can be made more compact.

Further, the shapes of one surface $31a$ and the other surface $31b$ of the positive lens 31 are respectively expressed by the above equations (4) and (5) and the relationship expressed by the equation (6) also is established, which means the fact such that at least one surface of the positive lens 31 is formed as an aspherical surface. In this case, such an aspherical surface causes spherical aberration so that, by the combination of the positive lens 31 and the negative lens 32 within the third lens group 3, the correction of chromatic aberration on the axis which is the same aberration on the axis can be carried out independently of the correction of the spherical aberration. Accordingly, the aberration correction of the third lens group 3 can be increased in freedom.

As a result, a burden on other lens groups, particularly on the fourth lens group 4 which focuses an image from an aberration correction standpoint can be reduced and therefore the focal length of the fourth lens group 4 can be reduced, thereby the full length of the zoom lens being reduced.

Furthermore, in the zoom lens of a so-called rear focus system formed of four lens groups of positive, negative, positive and positive lenses, the front three lens groups of the first to third lens groups 1 to 3 constitute an afocal system. That is, a bundle of light from the third lens group 3 becomes a parallel bundle of light. In this case, if the surface of the negative lens 32 in the third lens group 3 opposing the image side is shaped as substantially plane, then a re-focusing point of the reflected light from a target screen is formed near the target screen, causing a deterioration of image quality such as ghosts or the like. If the surface of the negative lens 32 opposing the image side is concave on to the image side, then the re-focusing point is formed at the rear side of the target screen as viewed from the object side. However, if the fourth lens group 4 is moved toward the object side in the wide angle lens mode, the above re-focusing point is moved near the focal point, hence a bundle of converged light is passed through the target screen so that problems such as ghosts or the like occur.

On the other hand, if the radius of curvature of the surface of the negative lens 32 opposing the image side is selected so as to satisfy the condition expressed by the above equation (7) and this surface is concave on the image side, then a re-focusing point of the reflected light from the target screen is formed on the object side rather than the focal point. Accordingly, since only a weak diverging lens from the re-focusing point is irradiated on the target screen, an offensive ghost or the like can be prevented from being produced.

An embodiment of the present invention will now be described with reference to the drawings.

FIG. 1 shows the zoom lens according to the embodiment of the present invention. As shown in FIG. 1, a fixed first lens group 1 having a positive refracting power, a second lens group 2 having a negative refracting power as a variation, a fixed third lens group 3 having a positive refracting power and a fourth lens group 4 having a positive refracting power as a compensator are provided in that order from the object side to an image surface 5. Assuming that components of arrows A1 and A2 vertical to the optical axis of the zoom lens correspond to magnifications and that components of arrows A1 and A2 parallel to the optical axis of the zoom lens correspond to the movements of the lens groups, then upon variable magnification the second lens group 2 is moved in response to the arrow A1 and the fourth lens group 4 is moved in response to the arrow A2 so as to compensate for the fluctuation of the image surface 5 upon variable magnification. The fourth lens group 4 is moved solely in response to the arrow A3 for providing the focusing function. That is, the zoom lens of this embodiment is composed of four lens groups of positive, negative, positive and positive lenses and is formed as a rear-focus system which belongs, for example, to a so-called inner-focus system.

Also, as shown in FIG. 1, an iris 6 is provided between the second lens group 2 and the third lens group 3, and a glass block 7 is provided between the fourth lens group 4 and the image surface 5 as an optical low-pass filter.

Further, the first lens group 1 is comprised of a negative meniscus lens 11 whose convex surface is opposed to the object side and a positive lens 12 bonded to the negative meniscus lens 11. The second lens group 2 is comprised of a negative meniscus lens 21 whose convex surface is opposed to the object side and a positive lens 23 bonded to the negative meniscus lens 21. The third lens group 3 is comprised of two separated lenses of a positive lens 31 and a negative lens 32 from the object side. The fourth lens 4 is comprised of a negative meniscus lens 41 whose convex surface is opposed to the object side and a positive lens 42 bonded to the meniscus lens 41.

Both surfaces of the positive lens 31 of the third lens group 3 are formed as aspherical surfaces, and the iris 6 is located just in front of the positive lens 31 in an opposing relation to the object side. There is then the advantage that spherical aberration can be satisfactorily corrected while aberration off the optical axis is not deteriorated by the aspherical surface.

Figure 2:
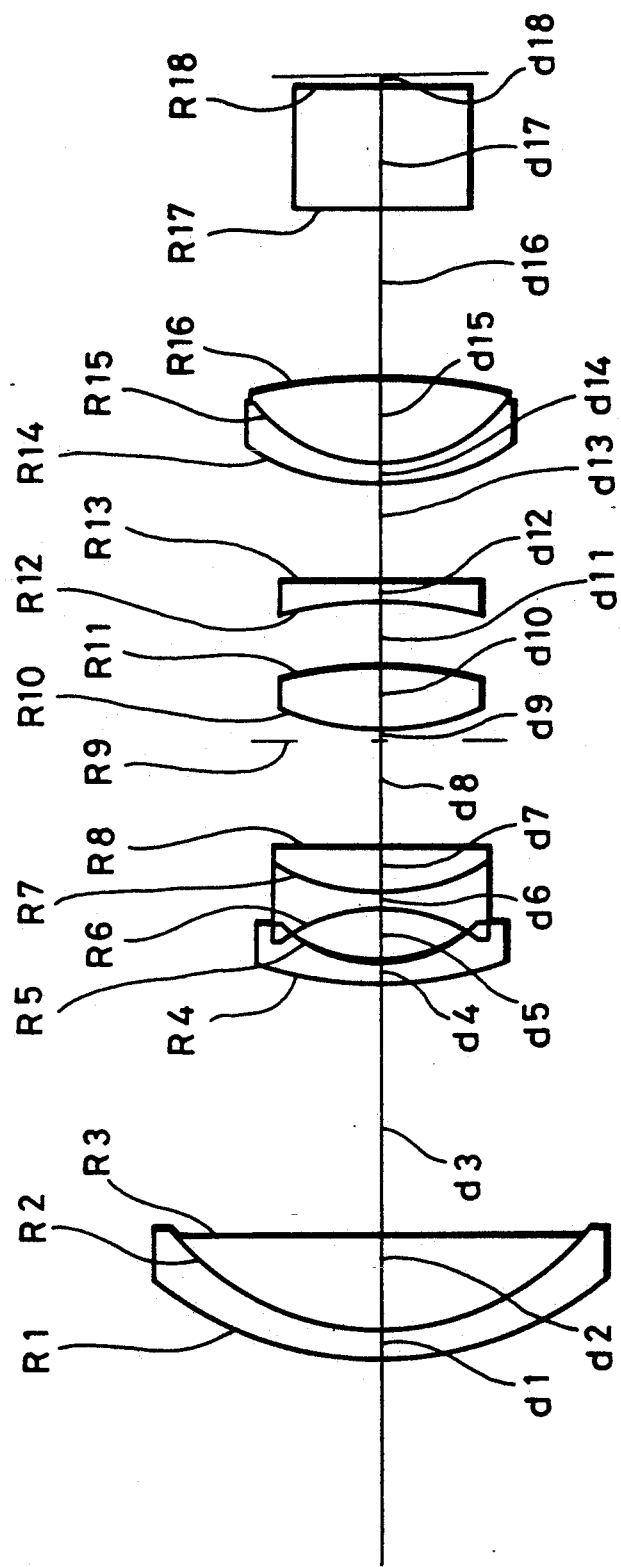
FIG. 2 is a schematic diagram showing an allocation of shape parameters in the arrangement of FIG. 1.

FIG. 2 shows the allocation of shape parameters of respective elements in the zoom lens according to this embodiment. As shown in FIG. 2, Ri is the radius of curvature of the i'th surface (i=1, 2 ...., 18) and di is the space between the i'th surface and (i=1)'th surface, respectively. Further, ni and vi are the refractive index of the d line of mercury in the respective medium between the i'th surface and (i+1)'th surface and its Abbe number, respectively.

In this case, the third, tenth, eleventh and sixteenth surfaces are formed of aspherical surfaces, respectively and the shape of the aspherical surface can be expressed by the following equation (8):

$$Z = \frac{Y^2/Ri}{1 + \sqrt{1 - (Ki + 1)Y^2/Ri^2}} + (ADi)Y^4 + (AEi)Y^6 + (AFi)Y^8 + (AGi)Y^{10} \quad (8)$$

n the above equation (8), Y represents the height from the optical axis of a point on the aspherical surface, Z represents the distance along the optical from the lens apex to the point, Ri (i=3, 10, 11, 16) represents the paraxial radius of curvature, Ki represents the constant of the cone of the i'th surface (conic coefficient) and Adi, AFi and AGi represent aspherical surface constants of the i'th surface, respectively, namely the 4th, 6th, 8th, and 10th order deformation coefficients. These aspherical surface coefficients are set as follows:

| i | Ki | ADi | AEi | AFi | AGi |
|---|---|---|---|---|---|
| 3 | 0 | $0.376 \times 10^{-5}$ | $-0.102 \times 10^{-8}$ | $-0.107 \times 10^{-11}$ | $0.226 \times 10^{-13}$ |
| 10 | 0 | $-0.229 \times 10^{-5}$ | $-0.259 \times 10^{-6}$ | $0.829 \times 10^{-9}$ | $0.112 \times 10^{-9}$ |
| 11 | 0 | $0.544 \times 10^{-4}$ | $-0.197 \times 10^{-6}$ | $-0.215 \times 10^{-8}$ | $0.164 \times 10^{-9}$ |
| 16 | 0 | $0.699 \times 10^{-4}$ | $-0.419 \times 10^{-7}$ | $-0.116 \times 10^{-8}$ | $0.133 \times 10^{-10}$ |

In that case, the 10'th surface and the 11'th surface are respectively the surfaces of the positive lens 31 of the third lens group 3 in an opposing relation to the object side and the image surface side and a condition expressed by the following equation (9) is imposed between the above two surfaces:

$$-K10/(8R10^3) - AD10 + K11/(8R11^3) + AD11 > 0 \quad (9)$$

Then, the values of the respective elements shown in FIG. 2 are set as follows:

| i | Ri | di | ni | vi |
|---|---|---|---|---|
| 1 | 27.99 | 1.71 | 1.805 | 25.5 |
| 2 | 19.62 | 6.86 | 1.589 | 61.3 |
| *3 | −173.25 | (variable) | | |
| 4 | 32.12 | 1.14 | 1.834 | 37.2 |
| 5 | 10.67 | 3.92 | | |
| 6 | −13.3 | 1.14 | 1.697 | 48.5 |
| 7 | 14.34 | 3.29 | 1.847 | 23.8 |
| 8 | −112.88 | (variable) | | |
| 9 | ∞ (iris) | 0.57 | | |
| *10 | 16.53 | 4.29 | 1.589 | 61.3 |
| *11 | −26.78 | 4.75 | | |
| 12 | −28.28 | 1.14 | 1.847 | 23.8 |
| 13 | 100.00 | (variable) | | |
| 14 | 18.66 | 1.14 | 1.785 | 25.7 |
| 15 | 11.76 | 5.71 | 1.694 | 53.3 |
| *16 | −30.87 | (variable) | | |
| 17 | ∞ | 8.29 | 1.517 | 64.2 |
| 18 | ∞ | 0 | | |

In the above table, values of Ri corresponding to i (i=3, 10, 11, 16) as shown by symbols * respectively represent radiuses of reference spherical surfaces of aspherical surfaces, respectively and the fact that r9 is ∞ corresponds to the fact that the iris is planar. Also, blanks in ni and vi correspond to areas in which a medium is air.

The whole focal length f of the zoom lens according to this embodiment lies in a range of from 10 to 60 mm, F number lies in a range of from 2.0 to 2.8 and a semi field angle w lies in a range of from 23.20° to 4.09°. Further, values of the above-mentioned variable spacings di (i=3, 8, 13, 16) in the wide angle lens position, the intermediate position and in the telephoto lens position are set as follows:

| f (mm) | d3    | d8    | d13   | d16   |
|--------|-------|-------|-------|-------|
| 10.0   | 2.16  | 23.03 | 10.39 | 8.99  |
| 30.3   | 17.69 | 7.50  | 7.22  | 12.16 |
| 60.0   | 24.76 | 0.43  | 10.55 | 8.83  |

If the above-mentioned values are utilized, then a focal length ft on the telephoto lens side becomes 60 mm, and a focal length fw on the wide angle lens side become 10 mm. Further, since a spacing ZL from the first surface of the lens to the focusing position is 88.5 mm, a zooming magnification ft/fw is 6 and the following equation is established:

$$ZL/ft = 1.48$$

As described above, according to this embodiment, while maintaining the characteristics such that the zooming magnification is large and that the F number is small, the full length of the zoom lens can be reduced considerably and the zoom lens can be miniaturized.

The radius of curvature R13 of the surface of the negative lens 32 of the third lens group 3 opposing the image surface 5 side according to this embodiment will be described with reference to FIG. 1. In the zoom lens according to this embodiment, the first to third lens groups constitute an afocal system so that, when a light bundle $\phi 1$ incident on the first lens group 1 is a parallel light bundle (particularly, a light bundle emitted from one point of an object located at a distant position can be regarded as a parallel light bundle in front of the lens), a light bundle $\phi 2$ emitted from the third lens group 3 to the fourth lens group 4 becomes close to a parallel light bundle. This parallel light bundle $\phi 2$ is converged at one point on the image surface 5 through the fourth lens group 4. In that case, a light reflected from the image surface 5 is returned through an opposite optical path to the negative lens 32 as a parallel light bundle $\phi 3$ so that, if the surface of the negative lens opposing the image surface 5 side is formed substantially as a plane, then a ghost or the like is produced on the image surface 5 by the reflected light of the negative lens 32.

In order to avoid the occurrence of ghost or the like, the radius of curvature R13 of the surface of the negative lens 32 opposing the image surface 5 side must satisfy the condition expressed by the following equation (10):

$$0 < R13 < 6\sqrt{fw \cdot ft} \qquad (10)$$

where the sign of the radius of curvature is determined so as to become positive when the lens surface becomes convex on the object side.

The above equation (10) means that $LF < \overline{LI}$ is established where the surface of the negative lens 32 opposing the image surface side becomes convexed relative to the image surface 5 side, where LF is defined to be the distance to a point at which a light bundle $\phi 4$ is converged from the negative lens 32 and LI is defined to be the distance between the negative lens 32 and the image surface 5. Accordingly, a weak reflected light, which is gradually diffused, is irradiated on the image surface 5 and the influence of ghosted or the like can be reduced.

Figures 5A, 5B, 5C:
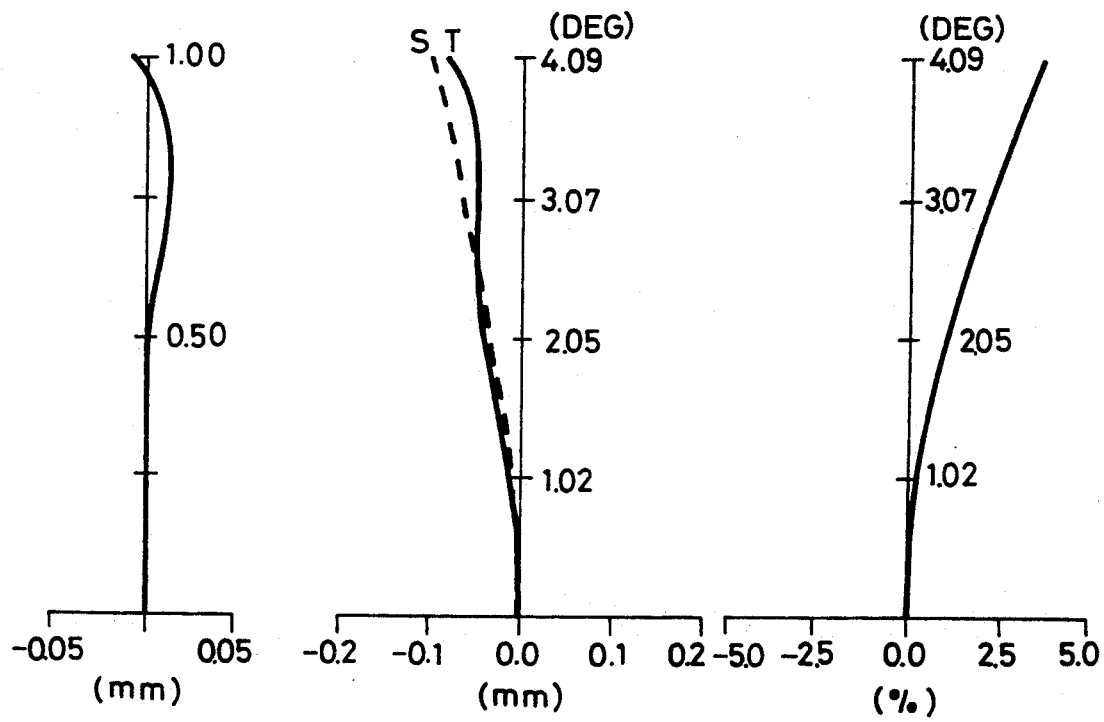
FIGS. 5A through 5C are schematic diagrams showing spherical aberration, astigmatism and distortion presented when the zoom lens of this embodiment is placed in the telephoto lens position, respectively.

FIGS. 3A to 3C, FIGS. 4A to 4C and FIGS. 5A to 5C respectively show various aberrations of the zoom lens according to this embodiment. FIGS. 3A, 3B and 3C show spherical aberration, astigmatism and distortion in the wide angle lens position (f=10.0 mm), respectively. FIGS. 4A, 4B and 4C show those in the intermediate position (f=30.3 mm), and FIGS. 5A, 5B and 5C show those in the telephoto lens position (f=60.0 mm), respectively.

According to the zoom lens of the present invention, in the zoom lens formed of four lens groups of positive, negative, positive and positive lenses, since the third lens component is composed of two positive and negative lenses having aspherical surfaces, there is then the advantage that the zoom lens can be miniaturized and reduced in weight while maintaining the characteristics such that the variable magnification ratio is large and that the F number is small. Further, when the surface of the negative lens opposing the image surface side is concave on the image surface side, then bad influences such as ghosts or the like due to the reflected light from the negative lens can be reduced.

Having described the preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

What is claimed is:

1. A zoom lens comprising sequentially from the side of an object a fixed first lens group having positive refracting power, a second lens group having negative refracting power and which provides variable magnification, a fixed third lens group having positive refracting power, and a fourth lens group having positive refracting power, which compensates for fluctuation of an image surface caused by said variable magnification and which focuses an image, wherein said third lens group consists of a positive lens and a negative lens, and wherein the shape of the surface of said positive lens of said third lens group opposing the object side is aspherical as given by:

$$Z = \frac{\frac{Y^2}{R31}}{1 + \sqrt{1 - (K31 + 1)\frac{Y^2}{R31^2}}} +$$

$$(AD31)Y^4 + (AE31)Y^6 + (AF31)Y^8 + (AG31)Y^{10}$$

where Y represents the height of a point of the aspherical surface from the optical axis; Z represents the distance along the optical axis from the lens apex to said point wherein, when such distance is toward the object side, it is assigned a negative value; R31 represents the paraxial radius of curvature and is positive as here when the respective surface is convex with respect to said object side; K31, AD31, AE31, AF31 and AG31 respectively represent the conic and 4th, 6th, 8th and 10th order deformation coefficients, and the shape of the surface of said positive lens opposing the image side is aspherical as given by $$Z = \frac{\frac{Y^2}{R32}}{1 + \sqrt{1 - (K32 + 1)\frac{Y^2}{R32^2}}} +$$

$$(AD32)Y^4 + (AE32)Y^6 + (AF32)Y^8 + (AG32)Y^{10}$$

wherein respective quantities are defined as above, R32 in this case being negative since the respective surface is concave with respect to said object side, wherein the values of respective ones of said coefficients satisfy $$-\frac{K31}{(8R31^3)} - AD31 + \frac{K32}{(8R32^3)} + AD32 > 0.$$

2. A zoom lens according to claim 1 wherein the surface of said negative lens on said image side is concave and the relation $$0 < R34 < 6\sqrt{fw \cdot ft}$$

is satisfied, wherein R34 is the radius of curvature of said surface of said negative lens which is concave on the object side, fw is the effective focal length of the zoom lens in the wide angle mode, and ft is the effective focal length of the zoom lens in the telephoto mode.

3. A zoom lens according to claim 2, wherein the respective coefficients have at least approximate values as follows $K31 = K32 = 0$ $AD31 = -0.229 \times 10^{-5}$  $AD32 = 0.544 \times 10^{-4}$
$AE31 = -0.259 \times 10^{-6}$  $AE32 = -0.197 \times 10^{-6}$
$AF31 = 0.829 \times 10^{-9}$  $AF32 = -0.215 \times 10^{-8}$
$AG31 = 0.112 \times 10^{-9}$  $AG32 = 0.164 \times 10^{-9}$.

4. A zoom lens according to claim 1, wherein the respective coefficients have approximate values as follows $K31 = K32 = 0$ $AD31 = -0.229 \times 10^{-5}$  $AD32 = 0.544 \times 10^{-4}$
$AE31 = -0.259 \times 10^{-6}$  $AE32 = -0.197 \times 10^{-6}$
$AF31 = 0.829 \times 10^{-9}$  $AF32 = -0.215 \times 10^{-8}$
$AG31 = 0.112 \times 10^{-9}$  $AG32 = 0.164 \times 10^{-9}$.

5. A zoom lens according to claim 2, further comprising:
an iris between said second and third lens groups approximately adjacent said third lens group, and
a glass block between said fourth lens group and the plane of an image formed by the zoom lens on the other side of the zoom lens than the object,
wherein the zoom lens constitutes a rear-focus system.

6. A zoom lens according to claim 1, said first to third lens groups constituting an afocal system.

7. A zoom lens comprising sequentially from the side of an object
a fixed first lens group having positive refracting power,
a second lens group having negative refracting power and which provides variable magnification,
a fixed third lens group having positive refracting power, and
a fourth lens group having positive refracting power, which compensates for fluctuation of an image surface caused by said variable magnification and which focuses an image,
wherein said third lens group consists of a positive lens and a negative lens, and further comprising
a focal length in the approximate range from 10 to 60 mm,
an F number in the approximate range from 2.0 to 2.8, and
a semi field angle w in the approximate range from 23 to 4.

8. A zoom lens comprising sequentially from the side of an object
a fixed first lens group having positive refracting power,
a second lens group having negative refracting power and which provides variable magnification,
a fixed third lens group having positive refracting power, and
a fourth lens group having positive refracting power, which compensates for fluctuation of an image surface caused by said variable magnification and which focuses an image,
wherein said third lens group consists of a positive lens and a negative lens, and wherein
the spacing ZL from the first lens surface on said object side to the focusing position on the other side of the zoom lens is approximately 88 mm,
the zooming magnification ft/fw is approximately 6, where fw is the effective focal length of the zoom lens in the wide angle mode and ft is the effective focal length of the zoom lens in the telephoto mode, and
the ratio ZL/ft is approximately 1.5.

9. A zoom lens comprising sequentially from the side of an object
a fixed first lens group having positive refracting power,
a second lens group having negative refracting power and which provides variable magnification,
a fixed third lens group having positive refracting power, and
a fourth lens group having positive refracting power, which compensates for fluctuation of an image surface caused by said variable magnification and which focuses an image,
wherein said third lens group consists of a positive lens and a negative lens,
said first lens group consisting of two lenses in contact along a common surface,
said second lens group consisting of a first lens adjacent a compound lens of two lenses in contact along a common surface, and
said fourth lens group consisting of two lenses in contact along a common surface,
wherein the 2nd, 9th, 10th, and 15th surfaces of the zoom lens in the order from said object side are aspherical surfaces, each said common surface being counted only once, namely the second surface of the second lens of said first lens group, both surfaces of said positive lens of said third lens group, and the second surface of the second lens of said fourth lens group.

10. A zoom lens comprising sequentially from the side of an object a fixed first lens group having positive refracting power, a second lens group having negative refracting power and which provides variable magnification, a fixed third lens group having positive refracting power, and a fourth lens group having positive refracting power, which compensates for fluctuation of an image surface caused by said variable magnification and which focuses an image, wherein said third lens group consist of a positive lens and a negative lens, wherein the shape of the surface of said positive lens of said third lens group opposing the object side is aspherical as given by $$Z = \frac{\frac{Y^2}{R31}}{1 + \sqrt{1 - \frac{Y^2}{R31^2}}} + (AD31)Y^4 + (AE31)Y^6 + (AF31)Y^8 + (AG31)Y^{10}$$

where Y represent the height of a point on the aspherical surface from the optical axis, Z represents the distance along the optical axis from the lens apex to said point, wherein when such distance is toward the object side it is assigned a negative values, R31 represents the paraxial radius of curvature an side positive as here when the respective surface is convex with respect to said object side, AD31, AE31, AF31 and AG31 respectively represent 4th, 6th, 8th and 10the order deformation coefficients, and the shape of the surface of said positive lens opposing the image side is aspherical as given by the above equation with corresponding coefficients including R32 which in this case is negative since the respective surface is concave with respect to said object side, wherein the values of respective ones of said coefficients satisfy $-AD31 + AD32 > 0$, 11. A zoom lens according to claim 10, wherein the surface of said negative lens on said image side is concave, and $$0 < R34 < 6\sqrt{fw \cdot ft}$$

is satisfied, wherein R34 is the radius of curvature of said surface of said negative lens which is concave on the object side, fw is the effective focal length of the zoom lens in the wide angle mode, and ft is the effective focal length of the zoom lens in the telephoto mode.

12. A zoom lens according to claim 11, wherein $AD31 = -0.229 \times 10^{-5}$  $AD32 = 0.544 \times 10^{-4}$
$AE31 = -0.259 \times 10^{-6}$  $AE32 = -0.197 \times 10^{-6}$
$AF31 = 0.829 \times 10^{-9}$  $AF32 = -0.215 \times 10^{-8}$
$AG31 = 0.112 \times 10^{-9}$  $AG32 = 0.164 \times 10^{-9}$.

13. A zoom lens comprising sequentially from the side of an object a fixed first lens group having positive refracting power, a second lens group having negative refracting power and which provides variable magnification, a fixed third lens group having positive refracting power and comprising a positive and a negative lens, and a fourth lens group having positive refracting power, which compensates for fluctuation of an image surface caused by said variable magnification and which focuses an image, wherein the zoom lens has a focal length in the approximate range from 10 to 60 mm, and F number in the approximate range from 2.0 to 2.8, a semi field angle w in the approximate range from 23 to 4, and the spacing ZL from the first lens surface on said object side of the zoom lens to the focusing position on the other side of the zoom lens is approximately 88 mm.

14. A zoom lens according to claim 13 said first to third lens groups constituting an afocal system.

15. A zoom lens according to claim 14, comprising said first lens group consisting of two lenses in contact along a common surface, said second lens group consisting of a first lens adjacent a compound lens of two lenses in contact along a common surface, and said fourth lens group consisting of two lenses in contact along a common surface, wherein the 2nd, 9th, 10th, and 15th surfaces of the zoom lens in the order from said object side are aspherical surfaces, each said common surface being counted only once, namely the second surface of the second lens of said first lens group, both surfaces of said positive lens of said third lens group, and the second surface of the second lens of said fourth lens group.

16. A zoom lens according to claim 15, wherein the shape of the surface of said positive lens of said third lens group opposing the object side is aspherical as given by $$Z = \frac{\frac{Y^2}{R31}}{1 + \sqrt{1 - \frac{Y^2}{R31^2}}} + (AD31)Y^4 + (AE31)Y^6 + (AF31)Y^8 + (AG31)Y^{10}$$

where Y represents the height of a point on the aspherical surface from the optical axis, Z represents the distance along the optical axis from the lens apex to said point, wherein when such distance is toward the object side it is assigned a negative value, R31 represents the paraxial radius of curvature and is positive as here when the respective surface is convex with respect to said object side, AD31, AE31, AF31 and AG31 respectively represent 4th, 6th, 8th and 10th order deformation coefficients, and the shape of the surface of said positive lens opposing the image side is aspherical as given by the same formula above with respective coefficient values, wherein respective quantities are defined as above, R32 in this case being negative since the respective surface is concave with respect to said object side, wherein the values of respective ones of said coefficients satisfy $$-AD31 + AD32 > 0,$$

17. A zoom lens comprising sequentially from the side of an object
   a fixed first lens group having positive refracting power,
   a second lens group having negative refracting power and which provides variable magnification,
   a fixed third lens goup having positive refracting power and comprising a positive and a negative lens, and
   a fourth lens group having positive refracting power, which compensates for fluctuation of an image surface caused by said variable magnification and which focuses an image,
   wherein said positive lens of said third lens group has an aspherical surface opposing the object side as given by $$Z = \frac{\frac{Y^2}{R31}}{1 + \sqrt{1 - (K31 + 1)\frac{Y^2}{R31^2}}} + (AD31)Y^4 + (AE31)Y^6 + (AF31)Y^8 + (AG31)Y^{10}$$

where Y represents the height of a point on the aspherical surface from the optical axis, Z represents the distance along the optical axis from the lens apex to said point, wherein when such distance is toward the object side it is assigned a negative value, R31 represents the paraxial radius of curvature and is positive as here when the respective surface is convex with respect to said object side, K31, AD31, AE31, AF31 and AG31 respectively represent the conic and 4th, 5th, 8th and 10th order deformation coefficients, and wherein the shape of the surface of said positive lens opposing the image side is aspherical as given by the same equation with corresponding coefficients, R32 in this case being negative since the respective surface is concave with respect to said object side, and wherein the values of respective ones of said coefficients satisfy $$-\frac{K31}{(8R31^3)} - AD31 + \frac{K32}{(8R32^3)} + AD32 > 0.$$

18. A zoom lens according to claim 17, wherein the respective coefficients have at least approximate values as follows $K31 = K32 = 0$ $AD31 = -0.229 \times 10^{-5}$   $AD32 = 0.544 \times 10^{-4}$ $AE31 = -0.259 \times 10^{-6}$   $AE32 = -0.197 \times 10^{-6}$ $AF31 = 0.829 \times 10^{-9}$    $AF32 = -0.215 \times 10^{-8}$ $AG31 = 0.112 \times 10^{-9}$    $AG32 = 0.164 \times 10^{-9}.$ 19. A zoom lens according to claim 18, wherein the surface of said negative lens of said third lens group on said image side is concave, and the relation $$0 < R34 < 6\sqrt{fw \cdot ft}$$

is satisfied, where R34 is the radius of curvature of said surface of said negative lens which is concave on the object side, fw is the effective focal length of the zoom lens in the wide angle mode, and ft is the effective focal length of the zoom lens in the telephoto mode.

* * * * *